No. 844,640.  PATENTED FEB. 19, 1907.
W. WEST.
RECEPTACLE FOR POWDERED MATERIALS.
APPLICATION FILED SEPT. 4, 1906.
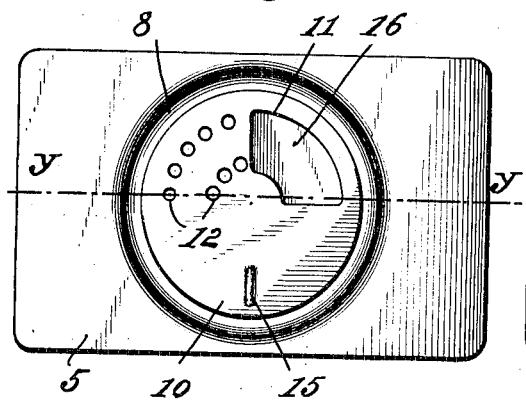
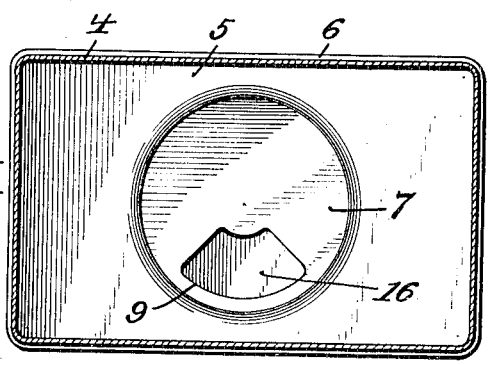
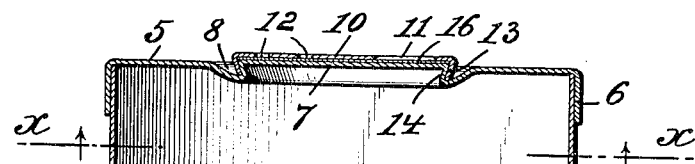
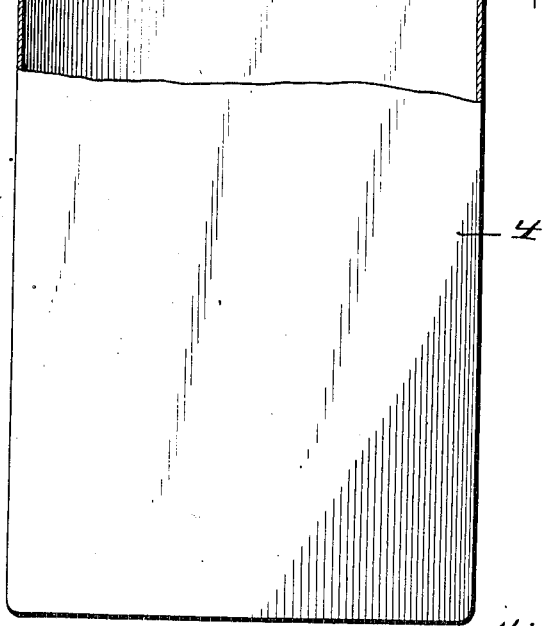
WITNESSES:
Wilhelm Vogt
Thomas M. Smith
INVENTOR
William West,
BY
J. Walter Douglas
ATTORNEY.

UNITED STATES PATENT OFFICE.

WILLIAM WEST, OF CAMDEN, NEW JERSEY.

RECEPTACLE FOR POWDERED MATERIALS.

No. 844,640.             Specification of Letters Patent.           Patented Feb. 19, 1907.

Application filed September 4, 1906. Serial No. 333,036.

*To all whom it may concern:*

Be it known that I, WILLIAM WEST, a citizen of the United States, residing at Camden, in the county of Camden and State of New Jersey, have invented certain new and useful Improvements in Receptacles for Powdered Materials, of which the following is a specification.

My invention has relation to a receptacle for powdered materials; and in such connection it relates particularly to the construction and arrangement of a movable cover for such a receptacle.

The principal objects of my invention are, first, to provide a receptacle for various materials with a perforated cover having an annular projection formed integral with the receptacle and a perforated cap, the shape of the wall of the projection and flange of the cap being such as to permit of a secure yet movable connection of the cap with the projection; second, to surround the projection of the receptacle with a depression to receive the flange of the cap and permit of the lowering of the projection of the receptacle, so that the same will only slightly project above the surface of the receptacle, and, third, to provide the cover so formed with a disk of flexible material to prevent discharge of the contents of the receptacle if the cap is accidentally turned thereon and also to determine by the shifting of the cap whether the contents of the receptacle have been tampered with by the breaking away of the disk.

The nature and objects of my invention will be more fully understood from the following description, taken in connection with the accompanying drawings, forming part hereof, in which—

Figure 1 is a top or plan view of a receptacle having a cover formed of a perforated projection and a perforated cap rotatably arranged on the projection of said cover embodying as to constructive arrangement of the same main features of my invention. Fig. 2 is a horizontal sectional view on the line *x x* of Fig. 3, and Fig. 3 is a side elevational view of the receptacle, partially sectioned, on the line *y y* of Fig. 1.

Referring to the drawings, 4 represents a receptacle of oblong outline in cross-section provided with a lid 5, having a downwardly-projecting flange 6, adapted when engaging the receptacle 4 to hold the lid 5 in frictional engagement therewith. The lid 5 is provided with an integral shallow inverted-cup-shaped projection 7, slightly extending above the upper surface of the lid 5 and separated therefrom by an annular substantially V-shaped depression 8. The projection 7 is provided, preferably, with a sector-shaped opening 9 and serves to support a cap 10, having a similarly-shaped opening 11 and with perforations 12. The cap 10 is provided with a downwardly and inwardly projecting flange 13, which when sprung over the projection 7 by engaging the tapering wall 14 thereof will be held securely but rotatably in position on the projection 7. The cap 10 by resting upon the projection 7 will be sufficiently raised above the lid 5 to permit in conjunction with the depression 8 of the engagement of the rim by the fingers, for which purpose the rim may be milled to permit a better grip thereof. However, a rib or projection 15 struck up from the cap 10 permits of the turning of the same on the projection 7 to bring the opening of the cap 10 or the perforations 12 into alinement with the opening 9 of the projection 7, in which position of the cap 10 a greater or less portion of the contents of the receptacle 4 may be removed therefrom when the same is held in a tilted position.

In order to prevent discharge of the contents of the receptacle 4 when the cap 10 is accidentally turned on the projection 7 during the storage or transit thereof and also to afford a means to detect tampering with the contents of the receptacle 4, the same is provided with a disk 16, of parchment paper or other flexible material. The disk 16 by being placed between the cap 10 and projection 7 is securely held in position by the same and prevents the discharge of the contents of the receptacle 4, even if the openings of the cap and projection are brought into alinement with each other. It is therefore necessary to destroy a portion of the flexible disk 16 before the contents of the receptacle 4 are made accessible for removal, and thus the disk 16 forms a safeguard against partial or complete removal of the contents of the receptacle and substitution of adulterated or inferior products for the genuine article.

Having thus described the nature and objects of my invention, what I claim as new, and desire to secure by Letters Patent, is—

1. A receptacle having a cover, consisting of a perforated shallow projection of inverted conical outline formed in one of the walls thereof and terminating in a depression in said wall, and a perforated cap provided with a downwardly and inwardly inclined flange, said flange when engaging the inclined wall of the projection adapted to hold the cap securely and movably thereon.

2. A receptacle having a cover provided with a perforated shallow inverted-cup-shaped projection and a perforated cap provided with a downwardly and inwardly inclined flange, the flange when engaging the peripheral wall of the projection adapted to hold the cap securely and movably thereon, and a disk of flexible material arranged between the projection and cap adapted to normally prevent discharge of the contents of the receptacle through the perforations of the cover.

3. A receptacle having a cover consisting of an annular projection provided with a downwardly and inwardly inclined wall terminating in a depression formed in the receptacle and surrounding said projection, a cap provided with a rib and with a downwardly and inwardly inclined flange, the flange when engaging the peripheral wall of the projection adapted to hold the cap securely thereon, and the rib of the cap adapted to permit of turning of said cap on said projection.

4. A receptacle having a cover, consisting of a perforated shallow projection extending slightly above the receptacle and provided with a downwardly and inwardly inclined wall terminating in a depression formed in the receptacle and a perforated cap provided with a rib and a downwardly and inwardly inclined flange, the flange when engaging the peripheral wall of the projection adapted to hold the cap securely thereon and the rib thereof adapted to permit of turning of the cap on said projection, and a disk of flexible material arranged between the projection and cap adapted to normally prevent discharge of the contents of the receptacle through the perforations of the cover.

In testimony whereof I have hereunto set my signature in the presence of two subscribing witnesses.

WILLIAM WEST.

Witnesses:
   GEO. W. REED,
   THOMAS M. SMITH.